Oct. 14, 1924.

E. R. BURTNETT

INTERNAL COMBUSTION ENGINE

Filed Feb. 13, 1924

1,511,706

Inventor.
EVERETT R. BURTNETT.
Attorney.

Patented Oct. 14, 1924.

1,511,706

UNITED STATES PATENT OFFICE.

EVERETT R. BURTNETT, OF LOS ANGELES, CALIFORNIA, ASSIGNOR OF ONE-HALF TO HOMER A. BRUNELL, OF LOS ANGELES, CALIFORNIA.

INTERNAL-COMBUSTION ENGINE.

Application filed February 13, 1924. Serial No. 692,500.

*To all whom it may concern:*

Be it known that I, EVERETT R. BURTNETT, a citizen of the United States, residing at Los Angeles, in the county of Los Angeles and State of California, have invented certain new and useful Improvements in Internal-Combustion Engines, of which the following is a specification.

My invention relates generally to internal combustion engines and particularly to engines of the two cycle type, the principal objects of my invention being to generally improve upon and simplify the construction of the existing forms of two stroke cycle engines; to provide an engine of the character referred to, with a valvular structure for controlling the admission of gaseous fuel from the mixer or carburetor to the precompression chamber and for effecting and controlling the transfer of the precompressed gaseous fuel from the precompression chamber to the combustion chamber and which valvular means is of relatively simple, compact structure, at the same time rugged and long lived in action, positive and silent in operation and said valvular structure cooperating with the other parts of the engine in producing a relatively high degree of thermal and mechanical efficiency.

With the foregoing and other objects in view, my invention consists in certain novel features of construction and arrangement of parts that will be hereinafter more fully described and claimed and illustrated in the accompanying drawings in which:

Figure 1:
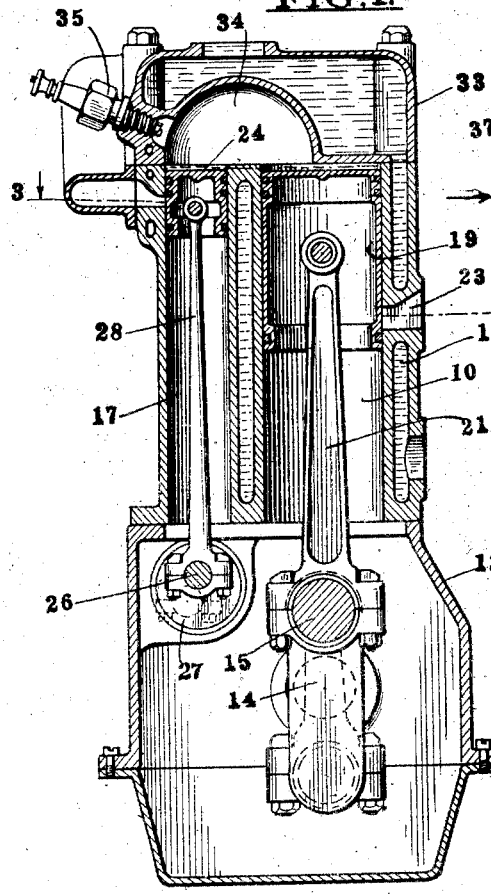
Fig. 1 is a vertical cross section taken through the center of the combustion cylinder of my improved engine and the piston valve cylinder that is directly associated therewith.
Figure 2:
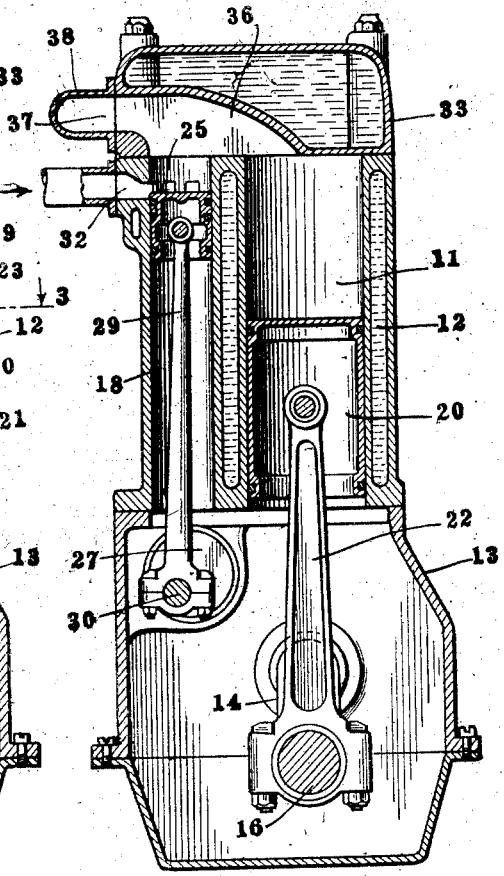
Fig. 2 is a vertical cross section taken through the center of the gaseous fuel pumping or precompression cylinder and associated valvular structure.
Figure 3:
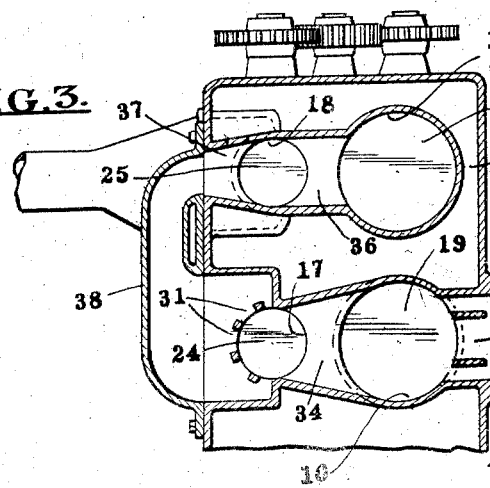
Fig. 3 is a horizontal section taken on the line 3—3 of Fig. 1.
Figure 4:
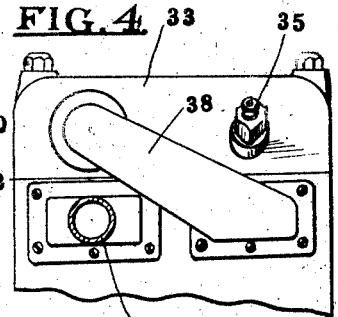
Fig. 4 is an elevational view of the upper portion of an engine of my improved construction.

Referring by numerals to the accompanying drawings, which illustrate a practical embodiment of my invention, 10 designates the combination cylinder and 11, the gaseous fuel pumping or precompression cylinder, the same being separately or integrally formed and arranged side by side with their axes substantially parallel.

The walls of these cylinders are preferably formed with connected chambers 12, through which may be circulated a fluid-cooling medium such as water.

The cylinders 10 and 11 surmount a suitable crank case 13, that is formed in two or more parts and journalled in suitable bearings that are formed on said crank case is a shaft 14 having two cranks 15 and 16. These cranks are arranged directly opposite to each other or 180 degrees apart, with crank 15 located beneath cylinder 10 and crank 16 beneath cylinder 11.

Arranged to the side of cylinder 10 and preferably formed integral therewith is a piston valve 17 of relatively small diameter and a similar valve cylinder 18 is arranged to the side of cylinder 11.

Pistons 19 and 20 are arranged for operation respectively in cylinders 10 and 11, the piston 19 being connected to crank 15 by a connecting rod 21 and piston 20 being connected to crank 16 by a similar connecting rod 22.

Formed through the wall of cylinder 10 and at a point where it is wholly uncovered, only when piston 19 is at low center or outer end of its stroke is an exhaust port 23.

Arranged for reciprocatory movement within the piston valve cylinders are respectively piston valves 24 and 25 and connecting piston 24 to a crank 26 of a crank shaft 27 is a connecting rod 28.

A similar connecting rod 29 connects piston valve 25 to a crank 30 on crank shaft 27 and the latter crank being arranged approximately 135 degrees behind crank 26 in the direction of crank rotation.

Crank shaft 27 is arranged for rotation in suitable bearings in the upper portion of crank case 13 and it is driven preferably from crank shaft 14, and at the same speed.

Formed through the wall of valve cylinder 17 near its upper end and where it is wholly uncovered only when piston valve 24 is at low center or the outer end of its stroke, is a series of gaseous fuel transfer inlet ports 31, all in the same horizontal plane.

Formed through the wall of valve cylinder 18, near the upper end thereof and at a point where it will be wholly uncovered only when piston valve 25 is at low center or at the outer end of its stroke, is a gaseous fuel inlet port 32 that is connected to a carburetor or other suitable source of gaseous fuel supply.

A head block 33 is secured to the upper ends of the cylinders 10, 11, 17 and 18 and closes the chambers therein and said block being formed with a chamber for a circulating cooling medium, such as water.

Formed in the underside of this block is a pocket or recess 34 that connects and serves as a common clearance chamber for the chambers in cylinders 10 and 17.

Seated in head block 33 and preferably at a point above the chamber in cylinder 17 is an ignition device 35, such as a spark plug, and the inner ends of the electrodes thereof project into chamber 34.

Formed in the underside of head 33 and connecting the upper ends of the chambers in cylinders 11 and 18 is a pocket or recess 36, the same having an outlet port 37 that opens on the side of head block, just above inlet port 32 and leading from said port 37 to inlet port 31 is a gaseous fuel transfer duct 38.

The operation of my improved engine is as follows:

Owing to the relative positions of cranks 30 and 16, said crank 30 being 45 degrees in advance of crank 16 in the direction of crank rotation, piston valve 25 travels slightly in advance of piston 20. While crank 30 is approaching, passing and leaving low center, the gaseous fuel inlet ports 32 are open and, as piston 20 is moving downward on its suction stroke, a charge of gaseous fuel will be drawn into the upper portions of the cylinders 11 and 18 and into pocket or recess 36.

The inlet ports 32 are covered as piston valve 25 moves upward and, as pumping piston 20 moves upward, the gaseous fuel charge drawn into the chambers as just described, will be compressed and at the point of highest compression, piston valve 24, on its downward movement, will uncover transfer inlet ports 31, thereby admitting the precompressed gaseous fuel charge into the chambers with cylinders 10, 17 and the common clearance chamber 34 and which gaseous fuel passes through port 37, duct 38 and said transfer inlet ports 31. During this admission of gaseous fuel, the cranks 15 and 26 to which piston 19 and piston valve 24 are respectively connected, are passing their low centers and on the succeeding upward movement of piston valve 24, the inlet ports 31 are covered and closed so that, as piston 19 moves upward, the admitted charge of precompressed gaseous fuel and whatever residual products of combustion remain in the combustion chamber will be compressed in the upper portions of the chambers in cylinders 10 and 17 and connecting chamber 34.

At a point of highest compression, or as piston 19 passes high center, a spark produced between the terminals of the electrodes of spark plug 35 will ignite the compressed charge of gaseous fuel and the power developed by the expansion following combustion will act directly on the head of piston 19 to drive the same downward and the power and motion thus produced will be directly transmitted to crank shaft 14 through connecting rod 21.

As piston 19 passes low center, the exhaust ports 23 are uncovered, thereby permitting the greater portion of the products of combustion to exhaust from the combustion chamber and, at the same time the gaseous fuel transfer inlet port 31 is uncovered thereby admitting a precompressed charge of gaseous fuel, the inflow of which will tend to drive before it the products of combustion remaining in the upper portion of the chamber in cylinders 17 and 10 and in the connecting chamber 34.

Thus it will be seen that the admission of gaseous fuel from the source of supply to the pumping cylinder 11 is controlled by piston valve 25, which in its reciprocatory movement, successively uncovers and covers the inlet ports 32 and that the transfer of the precompressed gaseous fuel into the combustion chamber 10 is controlled by piston valve 24, which in its travel successively uncovers and covers the transfer inlet ports 32.

An engine of my improved construction is comparatively simple, may be easily and cheaply produced, is provided with a strong, rugged, positively acting and noiseless valvular arrangement for controlling the admission and transfer of gaseous fuel and which engine, in operation, is highly efficient, with relatively low fuel consumption.

It will be understood that minor changes in the size, form and construction of the various parts of my improved engine may be made and substituted for those herein described without departing from the spirit of the invention, the scope of which is set forth in the appended claims.

I claim as my invention:

1. The combination, in a two stroke cycle internal combustion engine, a unit of four cylinders, two of which function as combustion cylinders, and the other two functioning as gaseous fuel pumping cylinders, pistons arranged for operation within said cylinders, the two combustion cylinders having a common clearance chamber, and the two pumping cylinders having a common clearance chamber, two crank shafts, the axis of one of the combustion cylinders and the axis of one of the pumping cylinders being centered on a line parallel with the axis of one of the crank shafts and arranged approximately symmetrical with respect to the center of the crank shaft with which it is associated, the axis of the other of the two combustion cylinders and the axis of the other of the two pumping cylinders being centered on a line parallel with the axis of the other crank shaft, the axis of the two crank shafts being parallel, one of said crank shafts being adapted to the means of power transmission for the output of power, the other crank shaft being adapted to maintain reciprocatory actuation of the pistons that are connected to it and which operate within one of the combustion cylinders and one of the pumping cylinders, and to actuate said pistons in true successive relation to the movements of the pistons in the other two cylinders, which last mentioned pistons are connected to the first mentioned or power transmission crank shaft, the two crank shafts operating simultaneously and at the same speed, there being ports formed in the wall of the combustion cylinder having the piston that is connected to the transmission crank shaft for the function of exhausting the products of combustion from said cylinder, there being ports formed in the wall of the second combustion cylinder, the piston of which is connected to the second or timing crank shaft for the function of admission of precompressed gaseous fuel mixture, there being ports formed in the wall of one of the pumping cylinders, the piston of which is connected to the second or timing crank shaft for the function of gaseous mixture admission means to the two pumping cylinders and common clearance chamber, a transfer passage leading from the common clearance chamber of the two pumping cylinders to the admission ports of combustion cylinders and ignition means located in the common clearance chamber for the combustion cylinders.

2. In an internal combustion engine, two cylinders having a common compression and combustion clearance, a piston arranged for operation within each cylinder, two crank shafts, the piston in one cylinder being connected to one crank shaft and the piston in the other cylinder being connected to the other crank shaft, the axis of one of the cylinders being on an approximate symmetrical line with the center of one of the crank shafts, the axis of the other cylinder being on an approximate symmetrical line with the center of the other crank shaft, the first crank shaft functioning for the transmission of power, the second mentioned crank shaft being connected to the first mentioned crank shaft so as to synchronize their operations and the movements of the pistons connected thereto, there being ports formed in the cylinder having the piston that is connected to the power transmitting crank shaft, for the function of exhausting the spent products of combustion from the common cylinder and clearance chamber of the two cylinders, and there being ports formed in the cylinder having the piston that is connected to the second mentioned crank shaft for the admission of precompressed gaseous fuel to said cylinder and the common clearance chamber of both cylinders.

3. In an internal combustion engine, a unit comprising a combustion cylinder, a pumping cylinder, a piston valve cylinder for said combustion cylinder and a piston valve for said pumping cylinder, pistons arranged for operation within said combustion and pumping cylinders, a crank shaft to which said pistons are connected, piston valves arranged for operation within said piston valve cylinders, a crank shaft to which said piston valves are connected, means connecting said crank shafts whereby the same operate synchronously, the chambers within the combustion and pumping cylinders being connected to the chambers within their respective piston valve cylinders by common clearance chambers, the combustion cylinder having an exhaust port, and a transfer duct from the common clearance chamber of the pumping cylinder to the chamber of the piston valve cylinder that is associated with the combustion cylinder.

In testimony whereof I affix my signature.

EVERETT R. BURTNETT.